United States Patent
Blouet

(10) Patent No.: US 9,646,613 B2
(45) Date of Patent: May 9, 2017

(54) METHODS AND SYSTEMS FOR SPLITTING A DIGITAL SIGNAL

(71) Applicant: Raphael Blouet, Dublin (IE)

(72) Inventor: Raphael Blouet, Dublin (IE)

(73) Assignee: DAON HOLDINGS LIMITED, George Town (KY)

( * ) Notice: Subject to any disclaimer, the term of this patent is extended or adjusted under 35 U.S.C. 154(b) by 132 days.

(21) Appl. No.: 14/093,200

(22) Filed: Nov. 29, 2013

(65) Prior Publication Data

US 2015/0154962 A1     Jun. 4, 2015

(51) Int. Cl.
| | | |
|---|---|---|
| G10L 21/00 | (2013.01) | |
| G10L 17/22 | (2013.01) | |
| G10L 15/04 | (2013.01) | |
| G10L 17/04 | (2013.01) | |
| G10L 17/16 | (2013.01) | |
| G10L 15/18 | (2013.01) | |
| H04M 3/38 | (2006.01) | |

(52) U.S. Cl.
CPC .............. *G10L 17/22* (2013.01); *G10L 15/04* (2013.01); *G10L 15/1807* (2013.01); *G10L 17/04* (2013.01); *G10L 17/16* (2013.01); *H04M 3/385* (2013.01)

(58) Field of Classification Search
CPC ..... G10L 17/00; G10L 13/10; G10L 15/1807; G10L 25/90; G10L 13/02; G10L 13/027; G10L 13/033; G06F 21/32; G06F 17/27; G06F 21/42

USPC ......... 704/273, 10, 201, 207, 231, 233, 235, 704/244, 256, 258, 260; 370/310; 726/3, 726/7

See application file for complete search history.

(56) References Cited

U.S. PATENT DOCUMENTS

| | | | | |
|---|---|---|---|---|
| 4,227,177 A | * | 10/1980 | Moshier | ................. G10L 15/00 704/231 |
| 5,274,695 A | | 12/1993 | Green | |
| 5,548,647 A | | 8/1996 | Naik et al. | |
| 5,913,196 A | * | 6/1999 | Talmor | .................... G10L 17/00 704/270 |
| 6,246,672 B1 | * | 6/2001 | Lumelsky | ............... H04L 29/06 370/310 |

(Continued)

FOREIGN PATENT DOCUMENTS

| | | |
|---|---|---|
| CN | 101464982 A | 6/2009 |
| CN | 103258270 A | 11/2015 |
| GB | 2525464 A | 10/2015 |

OTHER PUBLICATIONS

Leena, et al., "Extraction and representation of prosodic features for language and speaker recognition," Speech Comm., Elsevier, Oct. 1, 2008, vol. 50, No. 10, pp. 782-796.

(Continued)

*Primary Examiner* — Michael Colucci
(74) *Attorney, Agent, or Firm* — Kevin McDermott, Esq.

(57) ABSTRACT

A method for splitting a digital signal using prosodic features included in the signal is provided that includes calculating onset value locations in the signal. The onset values correspond to stress accents in the signal. Moreover, the method includes splitting, using a processor, the signal into a prosodic unit candidate sequence by superimposing the stress accent locations on the signal, and processing the sequence to include only true prosodic units.

16 Claims, 15 Drawing Sheets

(56) References Cited

U.S. PATENT DOCUMENTS

| | | | |
|---|---|---|---|
| 6,535,851 B1* | 3/2003 | Fanty | G10L 15/04 704/245 |
| 6,671,672 B1 | 12/2003 | Heck | |
| 6,957,337 B1* | 10/2005 | Chainer | G06F 21/32 713/168 |
| 6,978,238 B2 | 12/2005 | Wohlsen et al. | |
| 7,158,776 B1 | 1/2007 | Estes et al. | |
| 7,191,130 B1 | 3/2007 | Leggetter et al. | |
| 7,203,652 B1 | 4/2007 | Heck | |
| 7,356,168 B2 | 4/2008 | Tavares | |
| 7,386,448 B1 | 6/2008 | Poss et al. | |
| 7,427,019 B2 | 9/2008 | Haertel | |
| 7,567,896 B2 | 7/2009 | Coorman et al. | |
| 7,657,431 B2 | 2/2010 | Hayakawa | |
| 7,773,730 B1 | 8/2010 | Kittrell et al. | |
| 7,809,561 B2 | 10/2010 | Luan et al. | |
| 7,877,254 B2 | 1/2011 | Luan et al. | |
| 7,917,949 B2 | 3/2011 | Conley | |
| 7,962,336 B2 | 6/2011 | Luan et al. | |
| 7,996,214 B2* | 8/2011 | Bangalore | G10L 15/1807 704/207 |
| 8,010,367 B2 | 8/2011 | Muschett et al. | |
| 8,099,288 B2 | 1/2012 | Zhang et al. | |
| 8,112,279 B2* | 2/2012 | Addessi | G10L 13/00 704/258 |
| 8,131,551 B1* | 3/2012 | Cosatto | G10L 15/1807 704/246 |
| RE43,386 E* | 5/2012 | Blair | G10L 17/26 370/218 |
| 8,190,437 B2 | 5/2012 | Farrell et al. | |
| 8,219,404 B2* | 7/2012 | Weinberg | G10L 17/06 704/250 |
| 8,312,291 B2 | 11/2012 | Golic et al. | |
| 8,332,223 B2 | 12/2012 | Farrell et al. | |
| 8,417,526 B2 | 4/2013 | Bourdon | |
| 8,442,824 B2 | 5/2013 | Aley-Raz et al. | |
| 8,463,608 B2 | 6/2013 | Dow et al. | |
| 8,572,701 B2 | 10/2013 | Rathbun | |
| 8,589,167 B2 | 11/2013 | Baughman et al. | |
| 8,620,657 B2 | 12/2013 | Farrell et al. | |
| 8,645,137 B2 | 2/2014 | Bellegarda et al. | |
| 8,682,676 B2 | 3/2014 | Burns et al. | |
| 8,694,315 B1* | 4/2014 | Sheets | G06Q 20/40145 704/246 |
| 8,725,514 B2 | 5/2014 | Jaramillo et al. | |
| 8,775,187 B2 | 7/2014 | Summerfield et al. | |
| 8,812,319 B2 | 8/2014 | Skerpac | |
| 8,826,371 B2 | 9/2014 | Webb et al. | |
| 8,831,941 B2 | 9/2014 | Gilbert et al. | |
| 8,850,534 B2 | 9/2014 | White | |
| 8,874,442 B2 | 10/2014 | Aley-Raz et al. | |
| 8,887,259 B1 | 11/2014 | Harding | |
| 9,009,033 B2 | 4/2015 | Hon-Anderson | |
| 9,065,593 B2 | 6/2015 | Ganong, III et al. | |
| 9,076,448 B2 | 7/2015 | Bennett et al. | |
| 9,117,212 B2 | 8/2015 | Sheets et al. | |
| 9,135,237 B2 | 9/2015 | Deshmukh et al. | |
| 9,147,054 B1 | 9/2015 | Beal et al. | |
| 9,183,367 B2 | 11/2015 | Bao et al. | |
| 9,183,836 B2 | 11/2015 | Daye et al. | |
| 9,262,613 B1 | 2/2016 | Harding | |
| 9,269,085 B2 | 2/2016 | Webb et al. | |
| 9,304,624 B2 | 4/2016 | Fadell et al. | |
| 9,313,200 B2 | 4/2016 | Hoyos | |
| 9,318,114 B2 | 4/2016 | Zeljkovic et al. | |
| 9,348,988 B2 | 5/2016 | Dykstra-Erickson et al. | |
| 2002/0146154 A1 | 10/2002 | Davis et al. | |
| 2002/0147588 A1 | 10/2002 | Davis et al. | |
| 2002/0152073 A1* | 10/2002 | DeMoortel | G10L 13/10 704/260 |
| 2003/0163739 A1* | 8/2003 | Armington | G06F 21/32 726/3 |
| 2008/0133225 A1* | 6/2008 | Yamada | G10L 15/1807 704/207 |
| 2008/0195395 A1 | 8/2008 | Kim et al. | |
| 2009/0048843 A1* | 2/2009 | Nitisaroj | G10L 15/1807 704/260 |
| 2009/0055193 A1 | 2/2009 | Maislos et al. | |
| 2009/0076819 A1* | 3/2009 | Wouters | G10L 13/07 704/260 |
| 2009/0083036 A1* | 3/2009 | Zhao | G10L 13/10 704/260 |
| 2009/0171660 A1 | 7/2009 | Jian et al. | |
| 2009/0220056 A1 | 9/2009 | Simpson et al. | |
| 2009/0313025 A1* | 12/2009 | Conkie | G10L 13/06 704/266 |
| 2009/0319270 A1* | 12/2009 | Gross | G10L 15/22 704/246 |
| 2010/0004931 A1* | 1/2010 | Ma | G10L 15/08 704/244 |
| 2010/0146408 A1* | 6/2010 | Amsterdam | G06F 3/011 715/757 |
| 2010/0191532 A1* | 7/2010 | Rodriguez Serrano | G06K 9/00879 704/256.7 |
| 2010/0217599 A1* | 8/2010 | Statnikov | G10L 15/142 704/256 |
| 2011/0046958 A1* | 2/2011 | Liu | G10L 17/02 704/268 |
| 2011/0119052 A1* | 5/2011 | Onodera | G10L 15/187 704/10 |
| 2011/0161079 A1 | 6/2011 | Gruhn et al. | |
| 2011/0202346 A1* | 8/2011 | Meyer | G10L 13/02 704/260 |
| 2011/0246198 A1* | 10/2011 | Asenjo | B66B 13/26 704/247 |
| 2011/0260832 A1 | 10/2011 | Ross et al. | |
| 2011/0282666 A1* | 11/2011 | Washio | G10L 25/48 704/246 |
| 2012/0004899 A1* | 1/2012 | Arshi | G06Q 30/02 704/8 |
| 2012/0065977 A1* | 3/2012 | Tepperman | G10L 13/08 704/258 |
| 2012/0089387 A1* | 4/2012 | Gamon | G06F 17/274 704/9 |
| 2012/0130714 A1* | 5/2012 | Zeljkovic | G10L 17/24 704/235 |
| 2012/0166190 A1* | 6/2012 | Lee | G10L 21/0208 704/233 |
| 2012/0245942 A1* | 9/2012 | Zechner | G10L 25/90 704/254 |
| 2012/0253810 A1 | 10/2012 | Sutton et al. | |
| 2013/0024189 A1* | 1/2013 | Kim | G10L 13/04 704/201 |
| 2013/0132092 A1 | 5/2013 | Cabezas et al. | |
| 2013/0238334 A1* | 9/2013 | Ma | G10L 17/16 704/244 |
| 2013/0325473 A1* | 12/2013 | Larcher | G10L 17/10 704/249 |
| 2014/0081640 A1 | 3/2014 | Farrell et al. | |
| 2014/0188472 A1 | 7/2014 | Daye et al. | |
| 2014/0222428 A1 | 8/2014 | Cumani et al. | |
| 2014/0236572 A1* | 8/2014 | Meshulam | G10L 15/18 704/9 |
| 2014/0244257 A1 | 8/2014 | Colibro et al. | |
| 2014/0259126 A1 | 9/2014 | Dykstra-Erickson et al. | |
| 2014/0279514 A1 | 9/2014 | Sharp | |
| 2015/0025888 A1 | 1/2015 | Sharp | |
| 2015/0046162 A1 | 2/2015 | Aley-Raz et al. | |
| 2015/0089613 A1* | 3/2015 | Tippett | H04L 63/0853 726/7 |
| 2015/0249664 A1 | 9/2015 | Talhami et al. | |
| 2015/0254443 A1 | 9/2015 | Blessing | |
| 2015/0294670 A1 | 10/2015 | Roblek et al. | |
| 2015/0326571 A1 | 11/2015 | Gomar | |
| 2015/0347734 A1 | 12/2015 | Beigi | |
| 2016/0086607 A1 | 3/2016 | Aley-Raz et al. | |
| 2016/0093305 A1 | 3/2016 | Chang | |

(56) References Cited

U.S. PATENT DOCUMENTS

2016/0119338 A1 4/2016 Cheyer
2016/0127359 A1 5/2016 Minter et al.

OTHER PUBLICATIONS

Adami, et al., "Segmentation of Speech for Speaker and Language Recognition," EUROSPEECH 2003—Geneva, Sep. 1, 2003, pp. 841-844.
Extended European Search Report dated Mar. 24, 2015 for counterpart EPO Application No. 14192909.1-1901, pp. 1-13.
Sonmez, et al., "Modeling Dynamic Prosodic Variation for Speaker Verification," Nuance Communications, Inc., Oct. 1, 1998, pp. 1-4.
Kinnunen, et al., "An overview of text-independent speaker recognition: From features to supervectors," Speech Comm., Elsevier, Jan. 1, 2010, vol. 52, No. 1, pp. 12-40.
Lin, et al., "An Orthogonal Polynomial Representation of Speech Signals and Its Probablistic Model for Text Independent Speaker Verification," May 9, 1995, pp. 345-348.

\* cited by examiner

METHODS AND SYSTEMS FOR SPLITTING A DIGITAL SIGNAL

BACKGROUND OF THE INVENTION

This invention relates generally to signal processing, and more particularly, to methods and systems for splitting a digital signal using prosodic features included in the signal.

Users are required to prove who they claim to be during authentication transactions conducted under many different circumstances. For example, users may be required to prove their identity to passport control during an authentication transaction conducted in person at an airport or may be requested to prove their identity to a merchant while attempting to remotely purchase a product from a merchant system over the Internet. Claims of identity may be proven during authentication transactions based on voice biometric data captured from the user.

It is known for users to speak or utter a known phrase during voice biometric authentication transactions, and to process the utterance in accordance with text-dependent speaker verification methods. Text-dependent speaker verification methods use a speech transcription module to identify the phonetics in the utterance, and compare the uttered phonetics against speaker dependent and speaker independent phonetic models. Such text-dependent speaker verification methods allow comparing the uttered phonetics against user recitations of the same known phrase captured from the user during enrollment in an authentication system.

Other known methods of conducting voice biometric authentication transactions don't use direct knowledge of the phonetics content within the known phrase. Instead, such other methods use unsupervised learning techniques to model the known phrase. Specifically, such other systems estimate a speaker independent model of the known phrase using utterances of the known phrase as spoken by different speakers. A speaker dependent model of the known phrase may also be estimated from several utterances of the known phrase uttered by the user. Such speaker dependent models may be seen as a specialization of the speaker independent model given user utterances. Voice biometric data captured during authentication transactions is used to estimate a matching score, S1, against the speaker independent model and a matching score, S2, against the dependent model. When the difference between the matching scores S2 and S1 is greater than a threshold, the identity of the user is proven.

Yet other known methods of conducting voice biometric authentication transactions use phone sequences in speech to account for the dynamic aspects of speech. However, such methods require strong prior knowledge similar to that required for speech transcription systems.

BRIEF DESCRIPTION OF THE INVENTION

In one aspect, a method for splitting a digital signal using prosodic features included in the signal is provided that includes calculating onset value locations in the signal. The onset values correspond to stress accents in the signal. Moreover, the method includes splitting, using a processor, the signal into a prosodic unit candidate sequence by superimposing the stress accent locations on the signal, and processing the sequence to include only true prosodic units.

In another aspect, a system for splitting a digital signal using prosodic features included in the signal is provided that includes a processor and a memory. The memory is operable to store data. The processor is programmed to calculate locations of a phonetic cue type prosodic feature in a signal, where the signal represents an utterance. Moreover the processor is programmed to split the signal into a prosodic unit candidate sequence based on the calculated locations.

In yet another aspect, a method for splitting a digital signal is provided that includes extracting prosodic features from a digital signal representing a user utterance, and calculating, using a processor, locations of a phonetic cue type prosodic feature. The phonetic cue type prosodic feature is included in the extracted prosodic features. Moreover, the method includes splitting the signal into a prosodic unit candidate sequence based on the calculated locations.

DETAILED DESCRIPTION OF THE INVENTION

Figure 1:
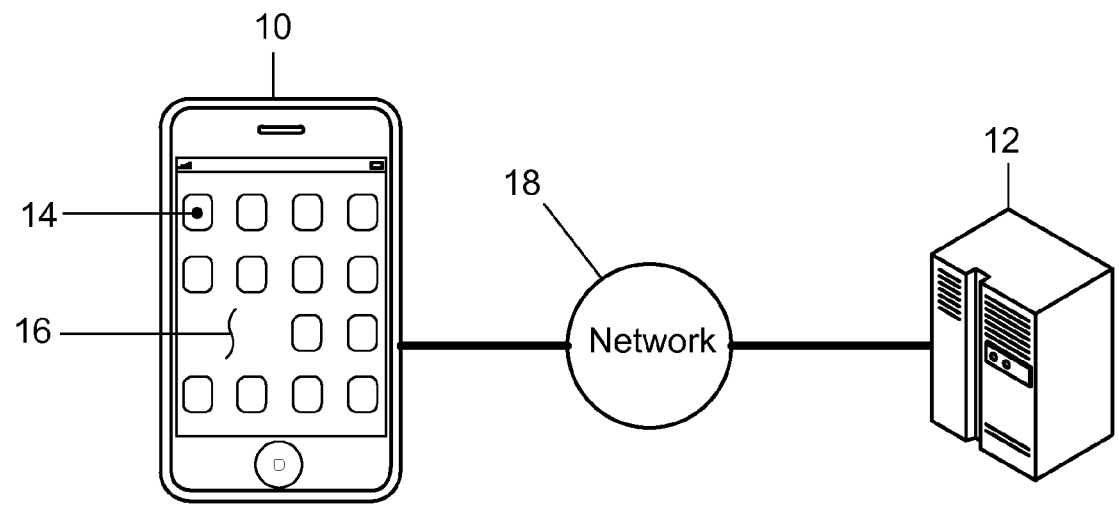
FIG. 1 is a diagram including an exemplary data capture device and an exemplary Authentication Computer System for splitting an audio digital signal.

FIG. 1 is a diagram including an exemplary data capture (DC) device 10 and an exemplary Authentication Computer (AC) System 12 that may be used for splitting an audio digital signal using prosodic features included in the signal.

The DC device 10 is a smart phone that may store applications and data therein, may display at least one of text and images, and is associated with a user. The DC device includes a microphone (not shown) and may include cameras (not shown). Moreover, the DC device 10 may include buttons and icons 14 for at least entering commands and invoking applications stored therein, and a display screen 16 such as, but not limited to, a Liquid Crystal Display (LCD) that displays at least one of text and images. The applications stored in the DC device 10 cause the DC device 10 to perform the functions described herein as being performed by the DC device 10. Moreover, the applications stored in the DC device 10 may cause the DC device 10 to perform functions described herein as being performed by the AC system 12, or by any other systems (not shown) and devices (not shown) that are operable to communicate with the DC device 10. Data that may be stored in the DC device 10 includes, but is not limited to, enrollment data records, signal features, and any information that may be used to authenticate users as described herein.

Although the exemplary DC device 10 is a smart phone, the DC device 10 may alternatively be any device that may capture voice biometric data. Such devices may also be capable of at least storing data and applications, executing the applications, displaying at least one of text and images, and capturing and transmitting data. Such other devices may be portable or stationary and include, but are not limited to, a cellular phone, a tablet computer, a laptop computer, a personal computer (PC) equipped with a microphone, and any type of device having wireless capabilities such as a personal digital assistant (PDA).

The DC device 10 is configured to communicate with the AC system 12, other systems (not shown), and devices (not shown) over a communications network 18. The communications network 18 is a 4G communications network. Alternatively, the communications network 18 may be any wireless network including, but not limited to, 3G, Wi-Fi, Global System for Mobile (GSM), Enhanced Data for GSM Evolution (EDGE), and any combination of a local area network (LAN), a wide area network (WAN) and the Internet. The network 18 may also be any type of wired network. Moreover, the DC device 10 is configured to conduct wireless communications such as cellular telephone calls and to wirelessly access the Internet over the network 18.

The DC device 10 may be used to capture authentication data from users and to process the captured authentication data. Moreover, the DC device 10 may authenticate user identities during authentication transactions based on the captured or processed authentication data. Alternatively, the DC device 10 may transmit captured authentication data to the AC system 12 for use in conducting authentication transactions. The DC device 10 may also process captured authentication data prior to transmitting it to the AC system 12. For example, the DC device 10 may create a template from captured authentication data and then transmit the template to the AC system 12. Any number of DC devices 10, that are each associated with a same or different user, may communicate with the AC system 12.

The AC system 12 includes components such as, but not limited to, a web server, a database server, an application server, a directory server, and a disk storage unit that may be used to store any kind of data. The disk storage unit may store at least one database such as, but not limited to, an authentication database. The application server stores applications therein that cause the AC system 12 to perform the functions described herein. Such applications include, but are not limited to, an onset detection application and an abrupt change detection application. The AC system 12 also includes a database management server and an authentication server. The database management server may be used to facilitate transferring data to and from the disk storage device. The authentication server may perform matching of any feature or information associated with users to authenticate the identity of users as described herein.

The AC system 12 is also configured to communicate with the DC device 10, other systems (not shown), and devices (not shown) over the network 18. Other systems (not shown) that the AC system 12 and the DC device 10 may communicate with include computer systems of service providers such as, but not limited to, financial institutions, medical facilities, national security agencies, and merchants. Other devices (not shown) that the AC system 12 and the DC device 10 may communicate with over the network 18 include, but are not limited to, smart phones, tablet computers, laptop computers, personal computers and cellular phones.

The authentication database may store at least authentication data of each of a plurality of users in enrollment data records. The authentication data may be any kind of information that may be used to authenticate users such as, but not limited to, biometric authentication data. Biometric authentication data may correspond to any biometric characteristic desired to be used as a basis of authentication such as, but not limited to, voice, face, finger, iris, palm, and electrocardiogram, and any combination of voice, face, finger, iris, palm, and electrocardiogram. Biometric authentication data may take any form such as, but not limited to, audio recordings, photographic images, and video.

The enrollment data record of each authorized user includes data such as, but not limited to, enrollment biometric data, enrollment biometric templates and personal data of the user. The enrollment biometric data is raw biometric data obtained from the user during enrollment in the AC system 12. The enrollment biometric data for each user is processed during enrollment to generate at least one enrollment biometric template, for each respective user, which may be used to conduct authentication transactions. The enrollment biometric template includes the parameters of at least one Hidden Markov Model (HMM). The enrollment biometric data may also be used to conduct authentication transactions. Personal data includes any demographic information regarding a user including, but not limited to, a user's name, gender, age, date-of-birth, address, citizenship and marital status. Each enrollment data record may also include any kind of data that may be used to authenticate the identity of users.

The enrollment biometric data is captured from, and the enrollment biometric template is generated for, each user during enrollment in the AC system 12. Alternatively, the enrollment biometric data may be obtained by other methods such as, but not limited to, automatically reading or extracting it from identity documents or from legacy databases included in other computer systems. The AC system 12 is configured to at least calculate signal features, split audio digital signals into prosodic unit candidate sequences, determine energy of prosodic unit candidates, process prosodic unit candidate sequences into a sequence that contains only true prosodic units, and create Hidden Markov Models. Creating Hidden Markov Models includes estimating parameters associated with an HMM such as, but not limited to, the initial state probability, transition probabilities, and parameters associated with each state emission density. The AC system 12 also optimizes the HMM parameters according to a given set of prosodic unit sequences by estimating the HMM parameters that either maximize the likelihood of the determined prosodic unit sequences or maximize posterior likelihood of the determined prosodic unit sequences according to a prior HMM model. Both estimations may be conducted using an Expectation Maximization algorithm.

The AC system 12 is also configured to create a Universal Background Model (UBM) as an HMM. The UBM is created using numerous utterances of the same phrase uttered by numerous speakers. As such, the UBM is a speaker independent model. The HMM for a particular user is created from at least one of several utterances of a known phrase uttered by the user. Thus, the HMM for each respective user is a speaker dependent model. The AC system 12 may also store Universal Background Models.

The AC system 12 may also store configurable authentication policies, some of which may be used to determine data that is to be captured from users during enrollment in the AC system 12, and others which may be used to determine an authentication data requirement. The authentication data requirement is the authentication data desired to be captured from users during authentication transactions. The authentication data requirement may be any type of authentication data, or any combination of the same or different types of authentication data and may be determined in any manner. For example, the authentication data requirement may be a phrase, alphanumeric text, or sentences spoken by a user during enrollment in the AC system 12 or during an authentication transaction in order to capture voice biometric data from the user.

The DC device 10 and the AC system 12, respectively, each include a processor (not shown) and a memory (not shown). It should be understood that, as used herein, the term processor is not limited to just those integrated circuits referred to in the art as a processor, but broadly refers to a computer, an application specific integrated circuit, and any other programmable circuit. It should be understood that the processors execute instructions, or computer programs, stored in the respective memories (not shown) of the DC device 10 and the AC system 12. The above examples are exemplary only, and are thus not intended to limit in any way the definition and/or meaning of the term "processor."

The respective memories (not shown) in the DC device 10 and the AC system 12 can be implemented using any appropriate combination of alterable, volatile or non-volatile memory or non-alterable, or fixed, memory. The alterable memory, whether volatile or non-volatile, can be implemented using any one or more of static or dynamic RAM (Random Access Memory), a floppy disc and disc drive, a writeable or re-writeable optical disc and disc drive, a hard drive, flash memory or the like. Similarly, the non-alterable or fixed memory can be implemented using any one or more of ROM (Read-Only Memory), PROM (Programmable Read-Only Memory), EPROM (Erasable Programmable Read-Only Memory), EEPROM (Electrically Erasable Programmable Read-Only Memory), an optical ROM disc, such as a CD-ROM or DVD-ROM disc, and disc drive or the like.

Each of the memories (not shown) can be a computer-readable recording medium used to store data, respectively, in the DC device 10 and the AC system 12. Moreover, each of the respective memories (not shown) can be a computer-readable recording medium used to store computer programs or executable instructions that are executed, respectively, by the DC device 10 and the AC system 12. Furthermore, the memories (not shown) may include smart cards, SIMs or any other medium from which a computing device can read computer programs or executable instructions. As used herein, the term "computer program" is intended to encompass an executable program that exists permanently or temporarily on any computer-readable recordable medium that causes the computer or computer processor to execute the program and thus causes the computer to perform a function. Applications as described herein are computer programs.

Figure 2:
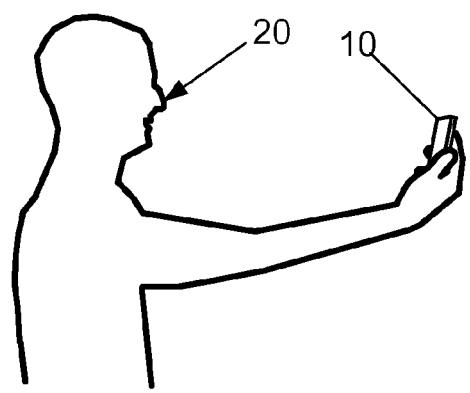
FIG. 2 is a side view of a user capturing an utterance from his self.

FIG. 2 is a side view of a user 20 capturing an utterance from his self using the DC device 10 during enrollment in the AC system 12 or during an authentication transaction. Generally, the utterance is a known phrase spoken by a user but may alternatively be a single letter or number, a group of letters or numbers, any combination of letters and numbers, or one or more sentences spoken by the user. The utterance is captured by the DC device 10 as an audio digital signal. Thus, the audio signal represents voice biometric data of the utterance. Moreover, because a known phrase is spoken by the user, the user utterance is captured as text-dependent voice biometric data. Alternatively, the utterance may be captured as a continuous analog signal and converted into a digital audio signal. While capturing the utterance from a user with the DC device 10, the DC device 10 may be operated by the user or another person.

Figure 3:
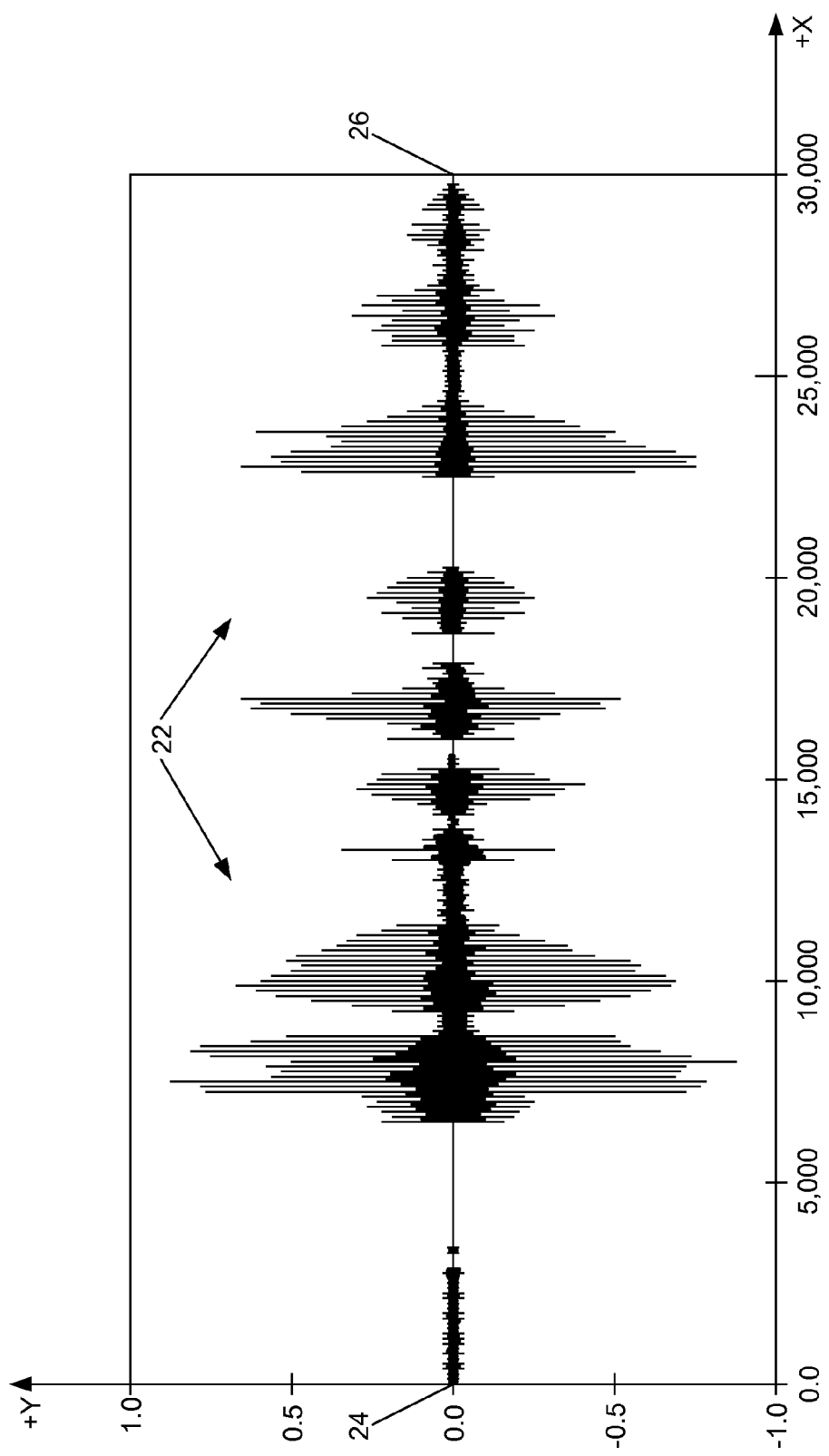
FIG. 3 is a diagram illustrating an exemplary audio digital signal which represents the captured utterance.

FIG. 3 is a diagram illustrating an exemplary audio digital signal 22 which represents the utterance. The audio digital signal 22 is plotted on a Cartesian coordinate system having X and Y-axes. The X-axis represents the number of discrete elements included in the captured voice biometric data in which each discrete element is captured at a rate, in seconds, equal to the inverse of a sampling frequency. The Y-axis represents the normalized values of the discrete elements of the signal 22. Alternatively, the Y-axis may represent the actual values of the discrete elements in the signal 22. The signal 22 extends from the origin 24 to a terminus 26 and has a duration of about three (3) seconds. The duration of the signal 22 depends on the phrase spoken by the user.

The information shown in FIGS. 4-13 is substantially the same information shown in FIG. 3 as described in more detail below. As such, features illustrated in FIGS. 4-13 that are identical to features illustrated in FIG. 3, are identified using the same reference numerals used in FIG. 3.

Figure 4:
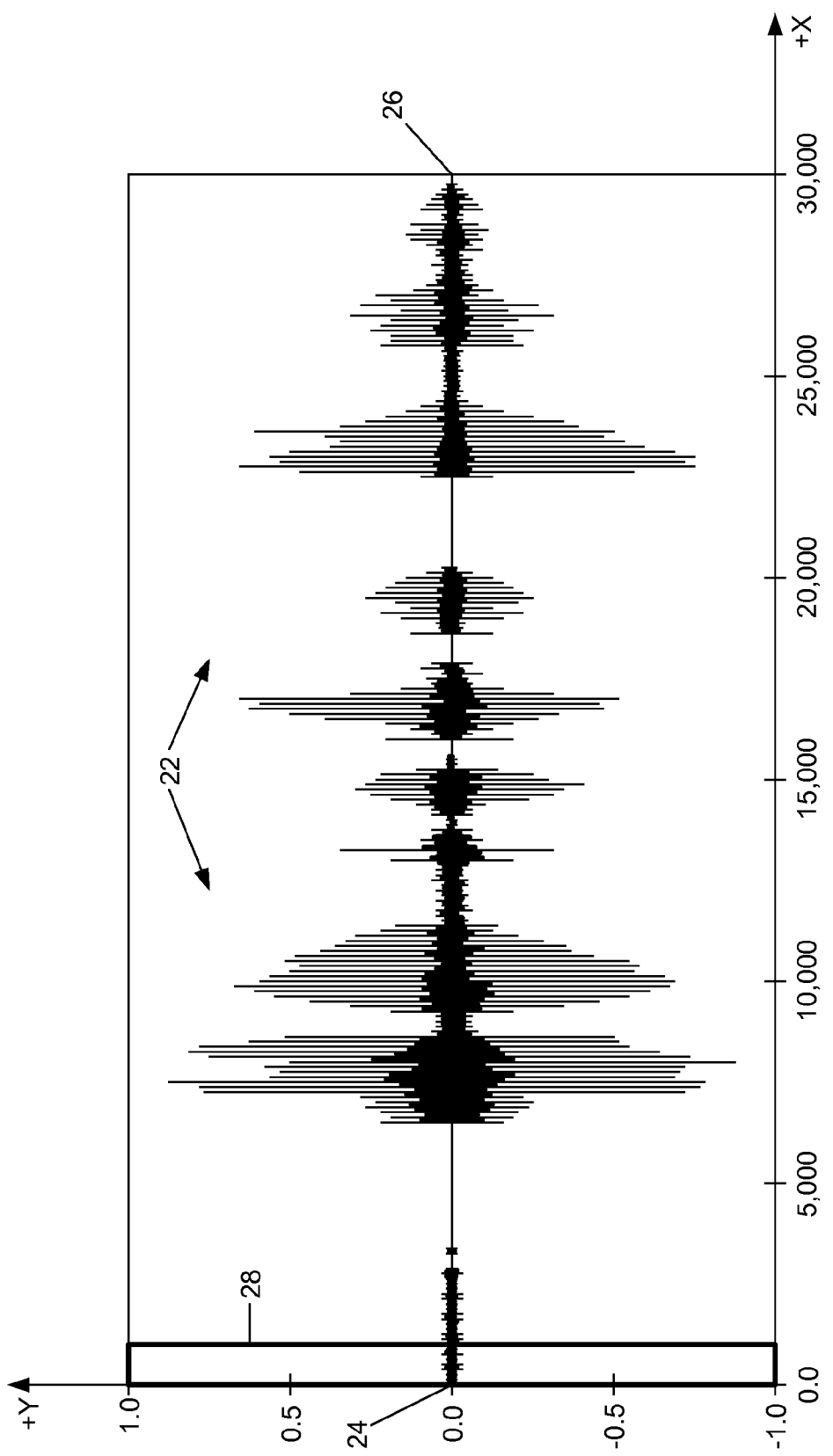
FIG. 4 is a diagram illustrating the signal as shown in FIG. 3 further including a temporal window.

FIG. 4 is a diagram illustrating the signal 22 as shown in FIG. 3 further including a temporal window 28. The temporal window 28 is located in an initial position flush with the origin 24 and has a duration of twenty-five (25) milliseconds. Alternatively, the temporal window 28 may be of any duration that facilitates splitting the signal into a desired number of true prosodic units for creating an HMM as described herein. The window 28 is translated in the positive direction along the X-axis over the duration of the signal 22 in ten (10) millisecond increments. Consequently, the temporal window 28 occupies many different positions over the signal 22.

In each different position, the window 28 includes a different portion of the signal 22, which portion is processed to calculate signal features for that portion of the signal 22. Such features include, but are not limited to, cepstral coefficients, spectral centroids, spectral roll-offs, zero crossing rates, energy levels, and onset values. The calculated signal features may be stored in the AC system 12. Alternatively, the calculated signal features may be stored in the DC device 10, or in any device or system operable to communicate with the AC system 12 or the DC device 10. After storing the signal features, the temporal window 28 is translated by ten (10) milliseconds along the X-axis into a different position.

Figure 5:
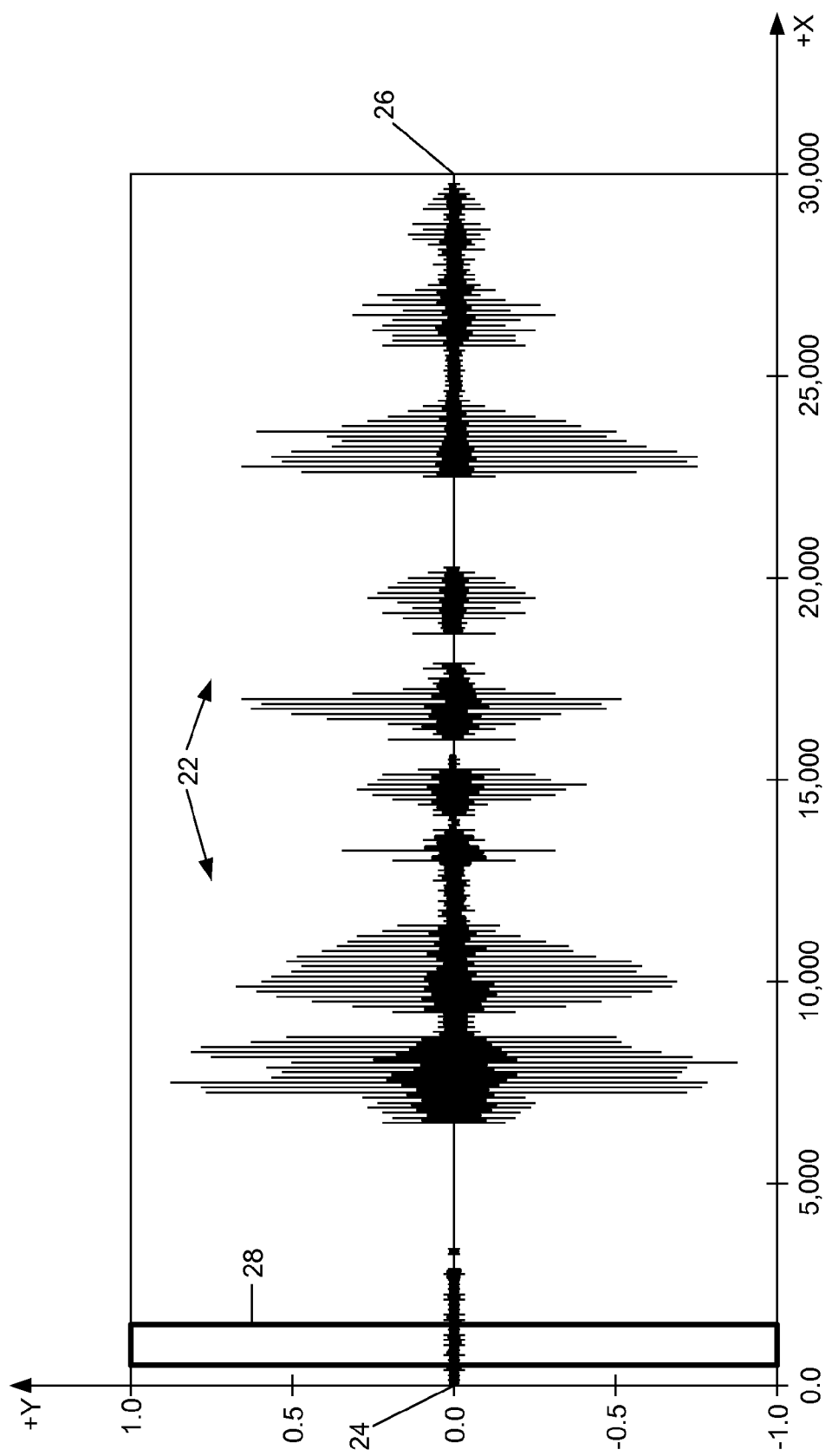
FIG. 5 is a diagram illustrating the signal as shown in FIG. 4 including the temporal window located in a different position.

FIG. 5 is a diagram illustrating the signal 22 as shown in FIG. 4 including the temporal window 28 located in the different position. The signal features for the portion of the signal 22 within the differently positioned window 28 are calculated and stored. After storing the signal features, the temporal window 28 is translated by ten (10) milliseconds along the X-axis into another different position.

Figure 6:
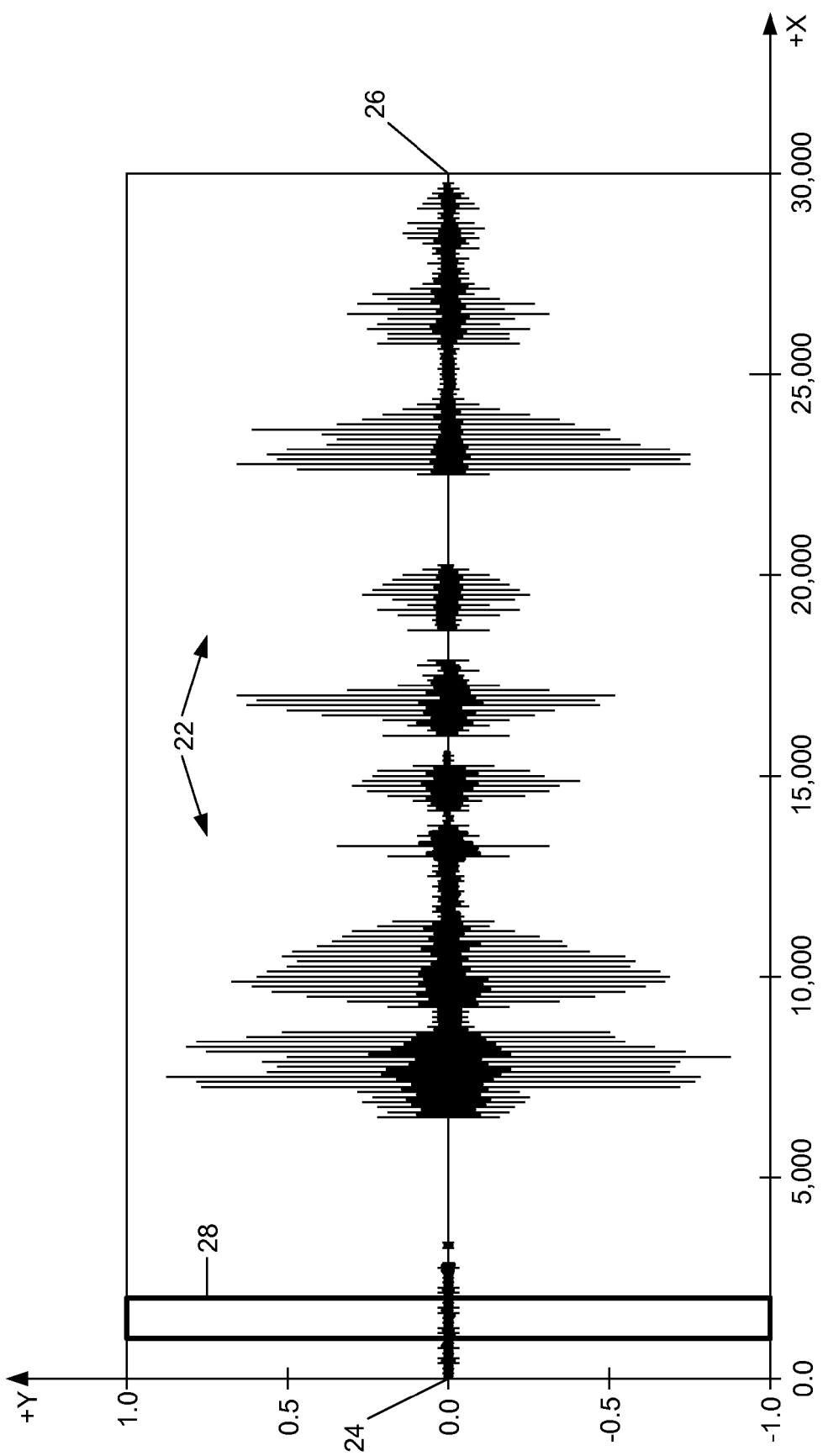
FIG. 6 is a diagram illustrating the signal as shown in FIG. 5 including the temporal window located in another different position.

FIG. 6 is a diagram illustrating the signal 22 as shown in FIG. 5 including the temporal window 28 located in the other different position. The signal features for the portion of the signal 22 within the differently positioned window 28 are calculated and stored. After storing the signal features, the temporal window 28 is translated by ten (10) milliseconds along the X-axis into yet another different position.

Figure 7:
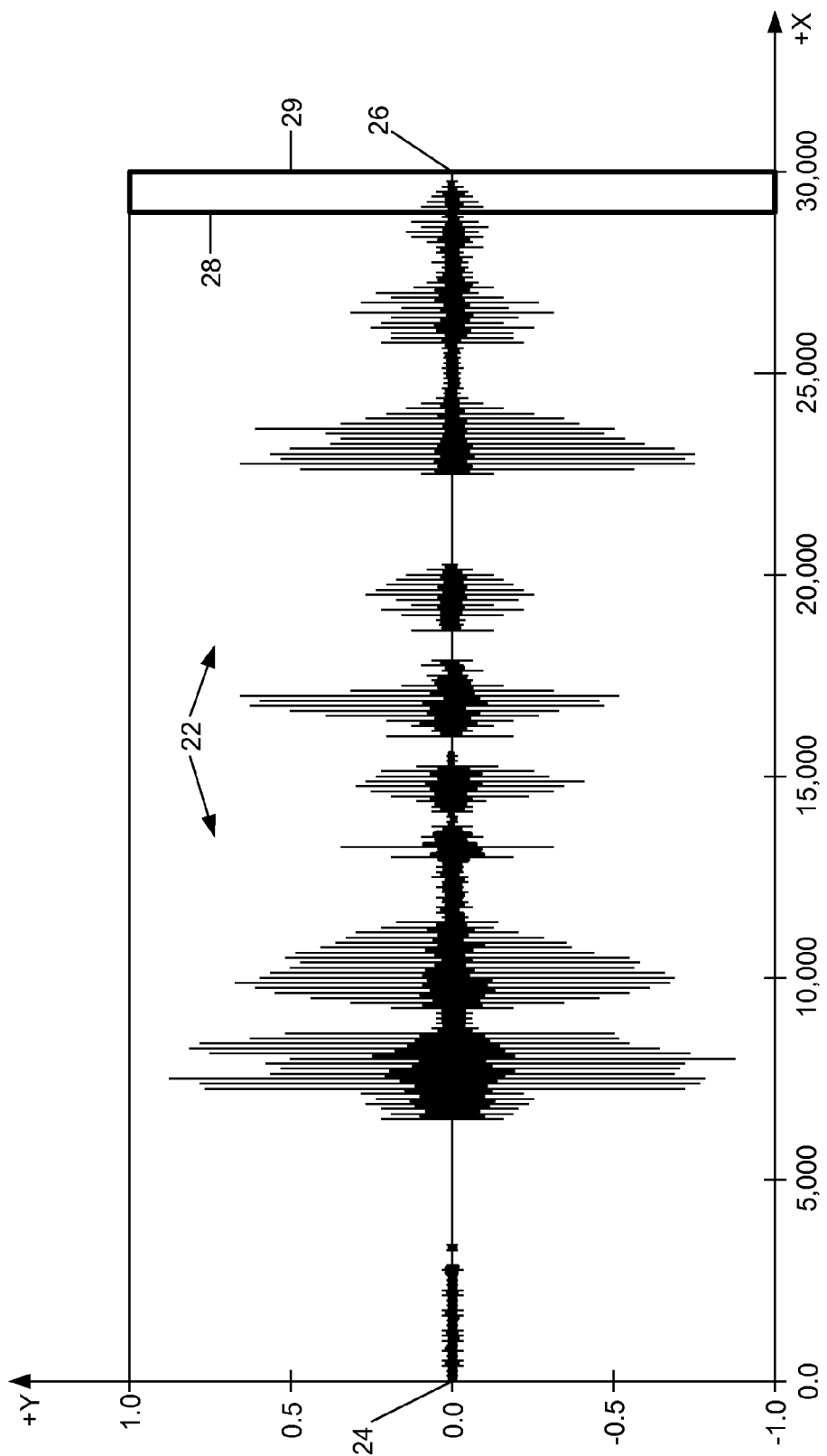
FIG. 7 is a diagram illustrating the signal as shown in FIG. 6 including the temporal window located in a final position.

FIG. 7 is a diagram illustrating the signal 22 as shown in FIG. 6 including the temporal window 28 located in a final position. In the final position, a side 29 of the temporal window 28 is flush with the terminus 26. More specifically, the temporal window 28 has been translated over the duration of the signal 22 to the final position. After calculating the signal features for the portion of the signal 22 within the finally positioned window 28, and storing the calculated signal features, the signal features calculated and stored for each position of the temporal window 28 are analyzed to determine information about the speaker and the structure and meaning of the utterance. Although the temporal window 28 is described as translating in ten (10) millisecond increments, the temporal window 28 may alternatively be translated at any time increment that facilitates splitting the signal into a desired number of true prosodic units for creating an HMM as described herein.

Prosodic features convey information about a speaker and the structure and meaning of an utterance. Thus, prosodic features characterize the way an utterance is spoken. Prosodic features include, but are not limited to, stress accents, rhythm, pitch, loudness, tempo, and intonation of speech. Signal features calculated from a signal representing the utterance may be used to extract prosodic features, for example, stress accents, from the utterance.

Onset values calculated for a signal identify the location and magnitude of an abrupt change that has occurred, or is occurring, in the signal. Stress accents typically occur at abrupt changes in a signal. Consequently, the onset values calculated for a signal representing an utterance may be used to determine the location of stress accents in the utterance. Thus, the locations of onset values calculated as a result of passing the temporal window 28 over the signal 22 may be used to determine the location of stress accents in the utterance.

A prosodic unit is the part of an utterance between prosodic features and gives the utterance rhythm. Typically, prosodic features representing phonetic cues are used to establish the bounds of corresponding prosodic units. Prosodic features representing phonetic cues include, but are not limited to, stress accent, pitch, and pauses. Thus, a signal representing an utterance may be split into a prosodic unit sequence based on phonetic cue type prosodic features. Moreover, it should be understood that any type of prosodic feature contained in the utterance may be used to split the utterance into a prosodic unit sequence.

Figure 8:
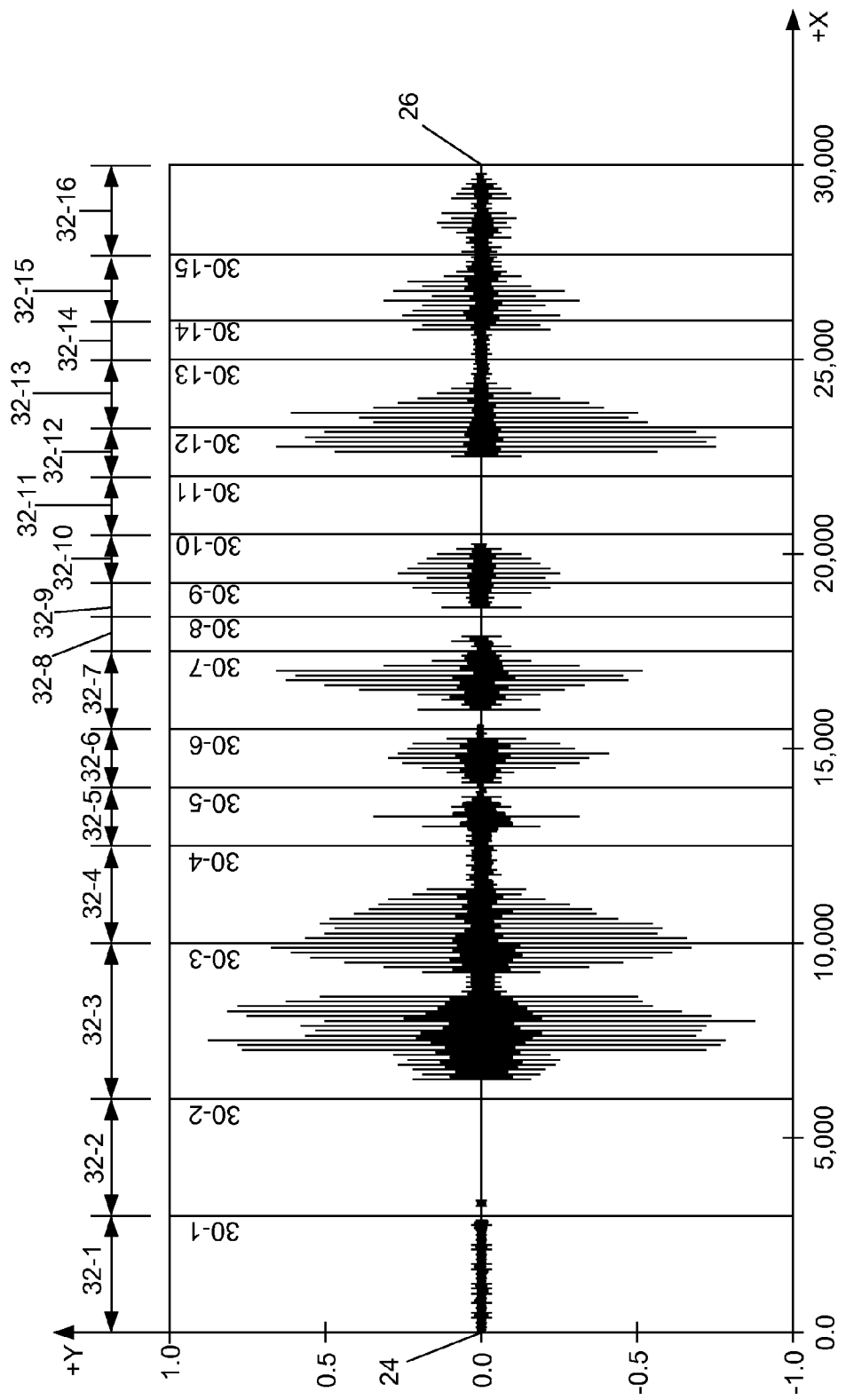
FIG. 8 is a diagram illustrating the signal as shown in FIG. 3 further including stress accents that split the signal into a sequence of prosodic unit candidates.

FIG. 8 is a diagram illustrating the signal 22 as shown in FIG. 3 further including stress accents 30-1 to 30-15 superimposed thereon that split the signal 22 into a sequence of prosodic unit candidates 32-1 to 32-16. The locations of the stress accents 30-1 to 30-15 may be calculated using an onset detection application and an abrupt change detection application. The onset detection application calculates a sequence of onset values for each portion of the signal 22 in each of the various positions of the window 28. The greater a calculated onset value, the more likely the calculated onset value represents a stress accent. After calculating the sequences of onset values, an abrupt change detection application determines the locations of the greatest onset values. By virtue of determining the locations of the greatest onset values, the abrupt change detection application determines the locations of the stress accents 30-1 to 30-15. Each stress accent 30-1 to 30-15 corresponds to one of the greatest onset values. The stress accents 30-1 to 30-15 are a phonetic cue type prosodic feature.

Prosodic unit candidates are potential true prosodic units. As such, prosodic unit candidates are not necessarily true prosodic units. True prosodic units are split by phonetic cues and contain only speech. The prosodic unit candidates 32-1 to 32-16 together constitute a prosodic unit candidate sequence created by virtue of splitting the signal 22 with the stress accents 30-1 to 30-15. It is possible that the portion of the signal 22 in each prosodic unit candidate does not contain speech data. The most trustworthy authentication results based on voice biometric data are generated from captured biometric data that includes only user speech and no other sounds or imperfections. The prosodic unit candidate sequence may be used to facilitate authenticating the user. Thus, prosodic unit candidates that are not true prosodic units should be removed from the sequence so that the sequence contains only true prosodic units. Prosodic sequences that include only true prosodic units facilitate generating more trustworthy results during authentication transactions.

Signal values calculated for the signal 22 may be applied to the prosodic unit candidate sequence such that prosodic unit candidates that are not true prosodic units are removed from the sequence. For example, the energy level of the prosodic unit candidates may be used to facilitate processing the prosodic unit sequence into a sequence that includes only true prosodic units. More specifically, after creating the prosodic unit candidate sequence, a high or low energy level is calculated for each prosodic unit candidate. The prosodic unit candidate energy levels are calculated using the energy levels calculated while passing the temporal window 28 over the signal 22. It should be understood that the signal 22 has a global energy level and that the high and low energy levels are measured relative to the global energy level.

Prosodic unit candidates having a low energy level include little or no useful signal 22 data. Consequently, low energy level prosodic unit candidates, including the portion of signal contained therein, are removed from the sequence. Prosodic unit candidates 32-2 and 32-11 are low energy level prosodic unit candidates and, thus, should be removed from the prosodic unit candidate sequence. After removing prosodic unit candidates 32-2 and 32-11 from the sequence, the prosodic unit candidate sequence includes candidates 32-1, 32-3 to 32-10, and 32-12 to 32-16.

Figure 9:
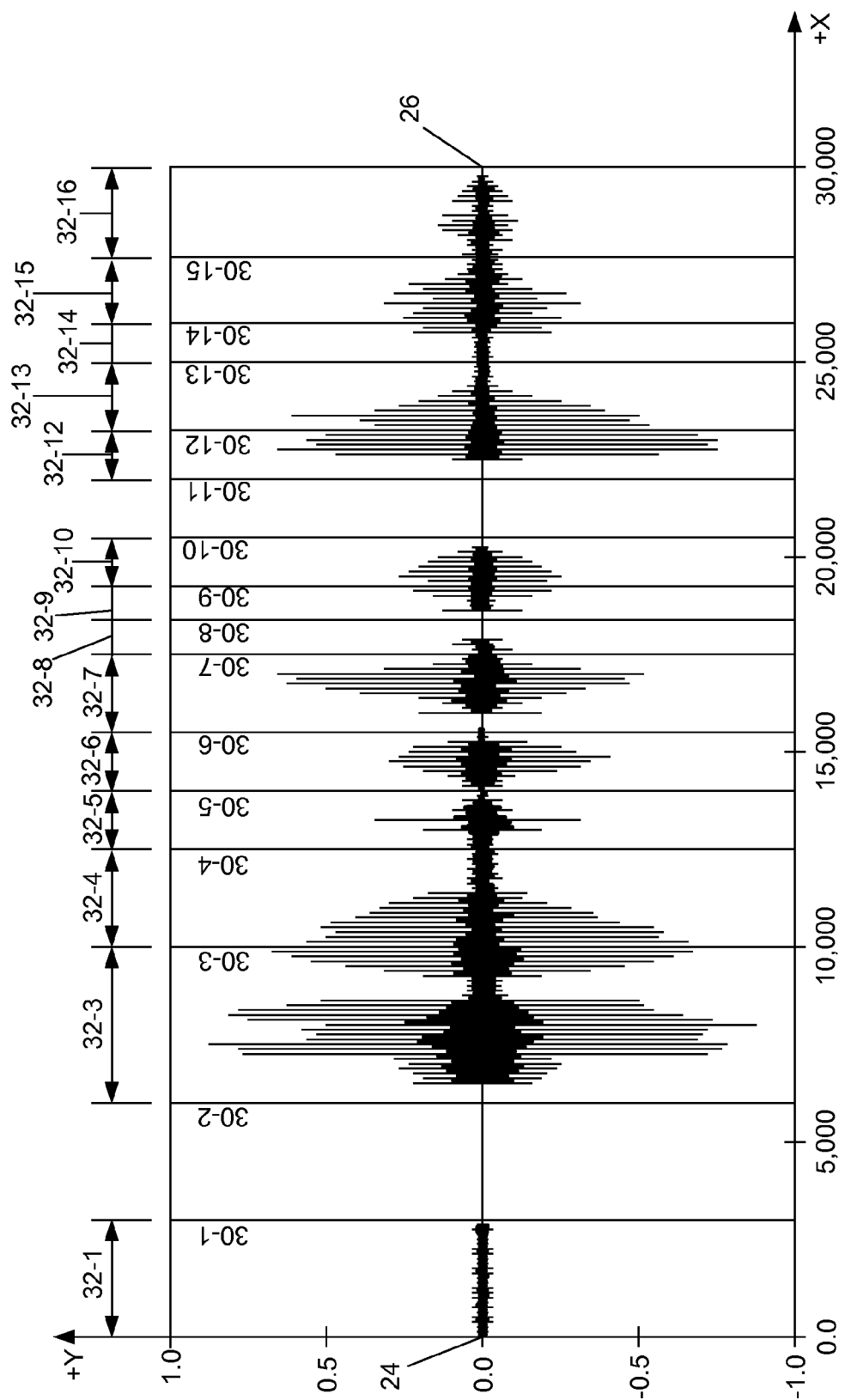
FIG. 9 is a diagram illustrating the prosodic unit candidate sequence as shown in FIG. 8 after removing low energy level candidates.

FIG. 9 is a diagram illustrating the prosodic unit sequence as shown in FIG. 8 after removing prosodic unit candidates. Thus, the sequence includes candidates 32-1, 32-3 to 32-10, and 32-12 to 32-16. Stress accents generally define the borders between prosodic unit candidates. The prosodic unit candidate borders should be located within a low energy level region of the signal 22. However, when a stress accent is associated with a high energy level region of the signal 22, the corresponding border should be moved to a low energy level region. The prosodic unit border defined by, or between, previous or successive stress accents should be moved to a low level energy region between the successive stress accents. For example, stress accent 30-3 is associated with a high energy region of the signal 22. Thus, the prosodic unit candidate border corresponding to stress accent 30-3 should be moved to the low energy level region between stress accents 30-2 and 30-3. Doing so ensures that each stress accent is associated with the entire portion of the signal 22 it is related to.

However, it should be understood that as a result of moving a border to a low energy level of the signal 22, the prosodic unit candidates that share the moved border change. Specifically, the duration of the prosodic unit candidates change. If the changed duration of either prosodic unit candidate is less than a threshold, the shared border is not moved to a low energy level region of the signal 22.

Figure 10:
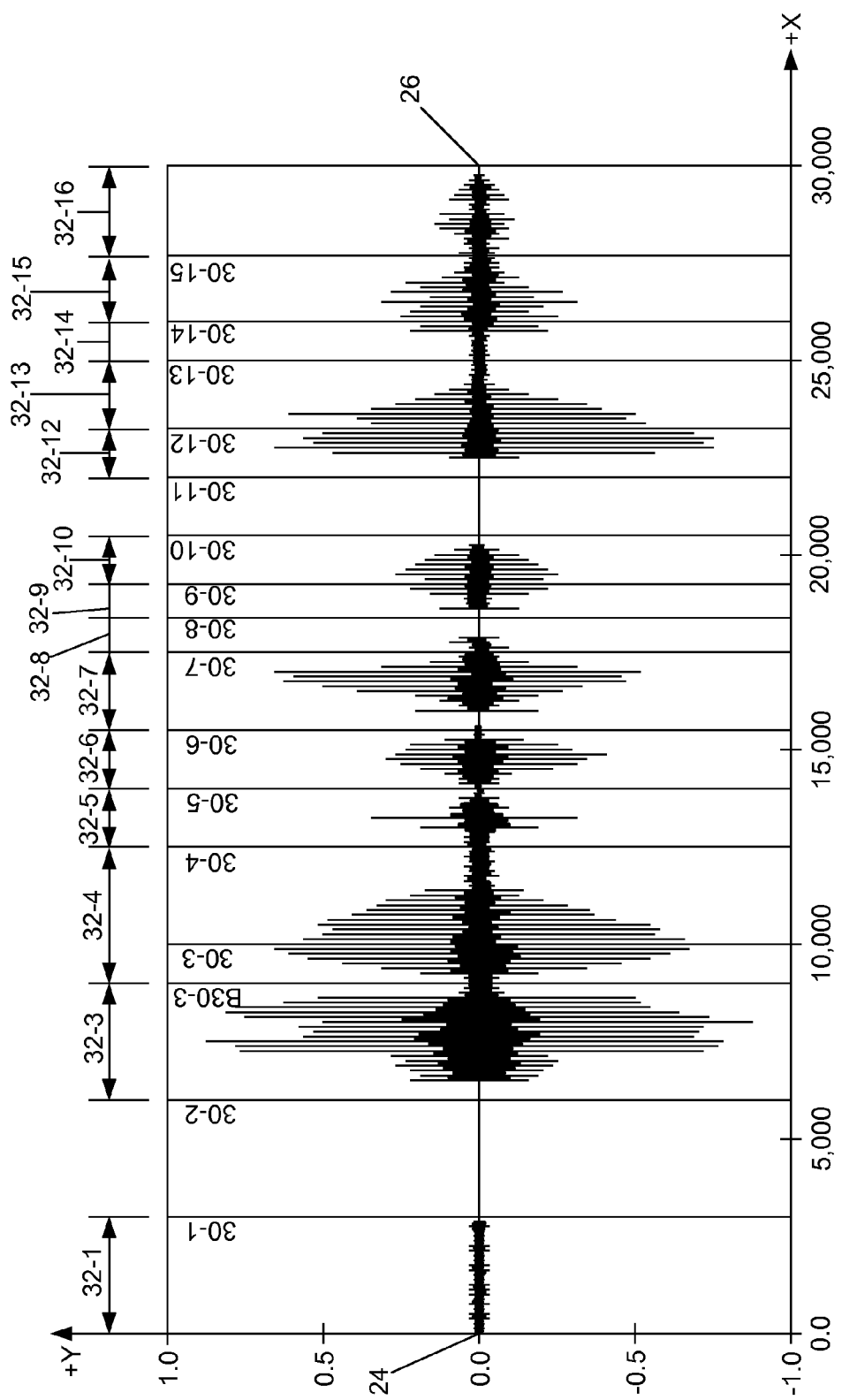
FIG. 10 is a diagram illustrating the prosodic unit candidate sequence as shown in FIG. 9 further including a relocated border between adjacent prosodic unit candidates.

FIG. 10 is a diagram illustrating the prosodic unit candidate sequence as shown in FIG. 9 further including a border B30-3 between adjacent prosodic unit candidates 32-3 and 32-4. The border B30-3 originally corresponded to the location of stress accent 30-3. Thus, the original border between candidates 32-3 and 32-4 has been moved, as boundary B30-3, to the low level energy region between the stress accents 30-2 and 30-3. Moreover, the changed durations of prosodic unit candidates 32-3 and 32-4 exceed a threshold duration. Although the boundaries between prosodic unit candidates may be relocated, it should be understood that the stress accent locations do not change.

Dispersion scores may also be used to facilitate modifying the prosodic unit candidate sequence into a sequence that includes only true prosodic units. A dispersion score is calculated for each prosodic unit candidate. The dispersion scores take into account the dispersion of all signal features calculated as a result of passing the temporal window 28 over the signal 22, and the duration of the prosodic unit candidate. Each candidate dispersion score is a measure of the contribution of the prosodic unit candidate to the global dispersion of all features over all prosodic unit candidates. The prosodic unit candidate having the highest contribution to the dispersion score is either removed or merged with an adjacent prosodic unit candidate. The candidate having the highest contribution to the dispersion score is removed from the sequence if it does not have an adjacent candidate. In the prosodic unit sequence, prosodic unit candidate 32-1 has the highest contribution to the dispersion. Moreover, prosodic unit candidate 32-1 does not have an adjacent prosodic unit candidate. Thus, prosodic unit candidate 32-1 should be removed from the sequence.

The prosodic unit candidate having the highest contribution may be adjacent to more than one candidate. The highest contribution candidate is merged with the adjacent candidate that facilitates the maximum decrease in the dispersion score when merging the highest contribution candidate with an adjacent candidate decreases the global dispersion score. Thus, the prosodic unit candidates 32-9 and 32-10 may be merged because the decrease of dispersion score obtained by merging prosodic unit candidates 32-9 and 32-10 is greater than the decrease of dispersion score obtained by merging prosodic unit candidates 32-8 and 32-9. Thus, prosodic unit candidates 32-9 and 32-10 should be merged.

Figure 11:
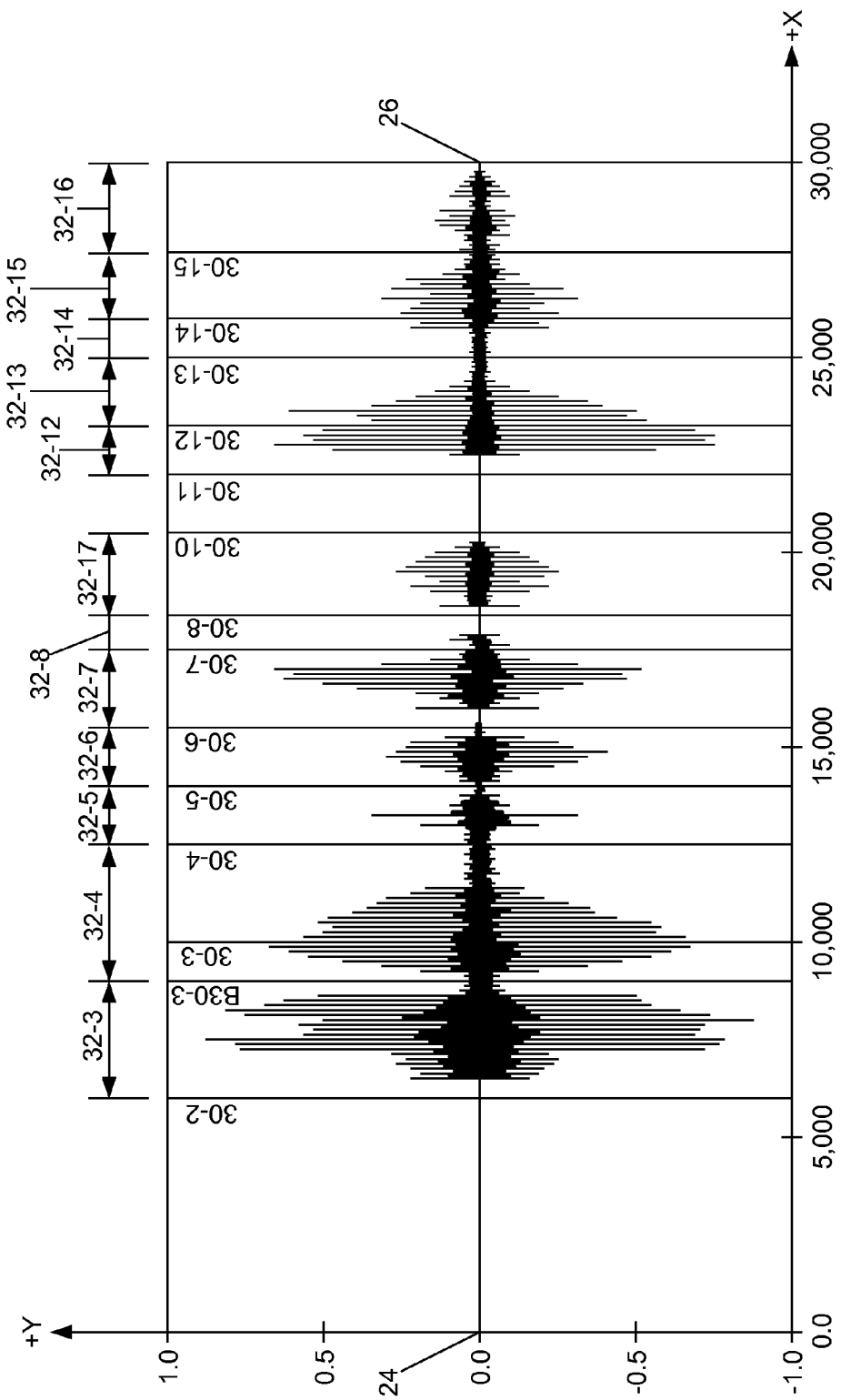
FIG. 11 is a diagram illustrating the prosodic unit candidate sequence as shown in FIG. 10 further including a merged prosodic unit candidate.

FIG. 11 is a diagram illustrating the prosodic unit candidate sequence as shown in FIG. 10 further including a new prosodic unit candidate 32-17 created by merging candidates 32-9 and 32-10. Moreover, prosodic unit candidate 32-1 has been removed because it did not have an adjacent prosodic unit candidate. By virtue of removing prosodic unit candidate 32-1 and merging candidates 32-9 and 32-10, the number of prosodic unit candidates in the prosodic unit sequence is reduced from fourteen to twelve. Specifically, the prosodic unit sequence includes prosodic unit candidates 32-3 to 32-8 and 32-12 to 32-17. The decrease of dispersion score obtained by merging prosodic unit candidates 32-14 and 32-15 is greater than the decrease of dispersion score obtained by merging prosodic unit candidates 32-13 and 32-14. Thus, prosodic unit candidates 32-14 and 32-15 should also be merged.

Figure 12:
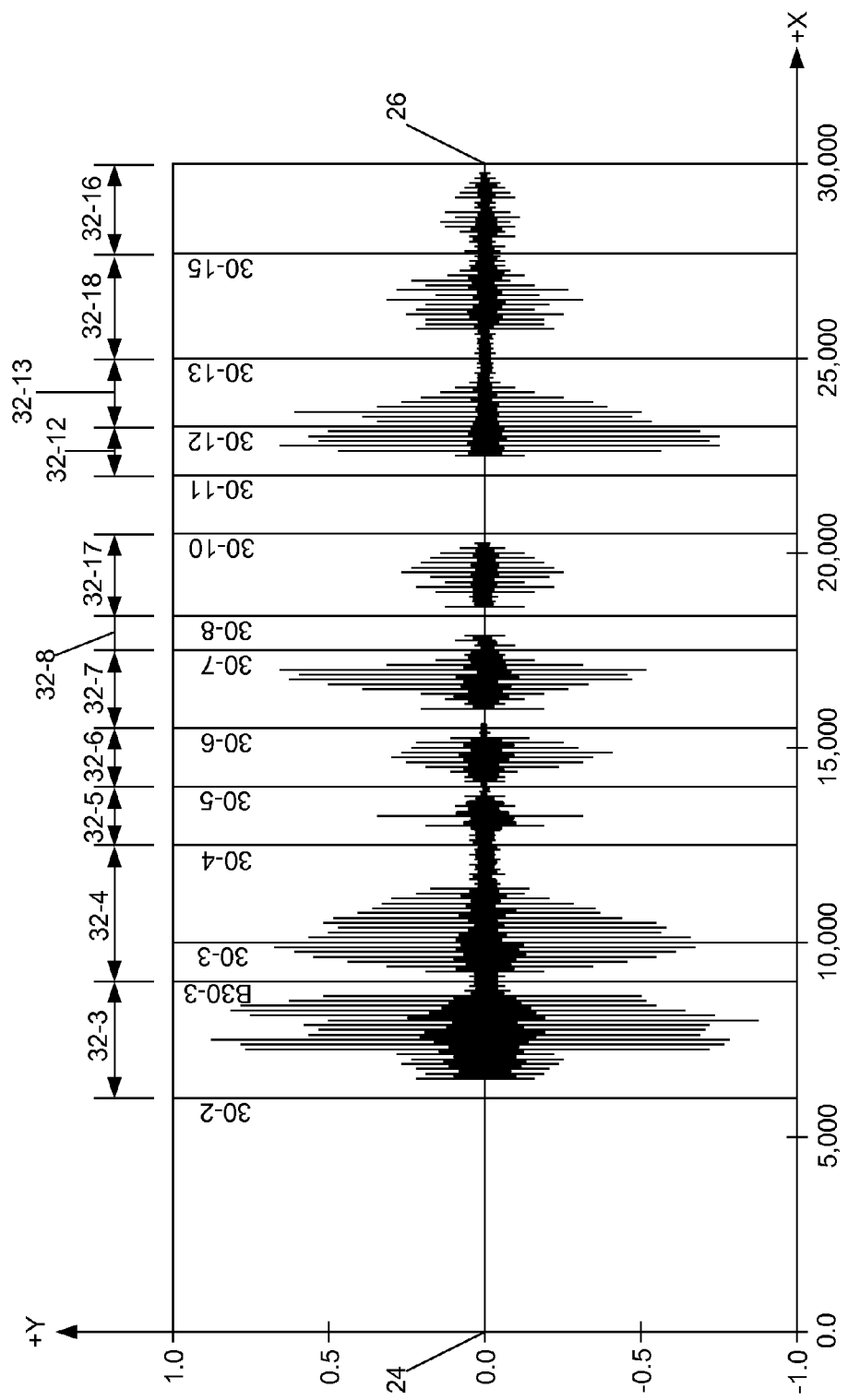
FIG. 12 is a diagram illustrating the prosodic unit candidate sequence as shown in FIG. 11 further including another merged prosodic unit candidate.

FIG. 12 is a diagram illustrating the prosodic unit candidate sequence as shown in FIG. 11 further including the new prosodic unit candidate 32-18 created by merging candidates 32-14 and 32-15. By virtue of merging candidates 32-14 and 32-15, the number of prosodic unit candidates in the prosodic unit sequence is reduced from twelve to eleven. Specifically, the prosodic unit sequence includes prosodic unit candidates 32-3 to 32-8, 32-12, 32-13, and 32-16 to 32-18. The desired number of candidates is ten. Consequently, two prosodic unit candidates should be merged in order to reduce the number of candidates in the sequence to the desired number. More specifically, the prosodic unit candidate with the highest dispersion score should merge with an adjacent prosodic unit candidate. Prosodic unit candidate 32-16 has the highest dispersion score so it should merge with prosodic unit candidate 32-18.

Figure 13:
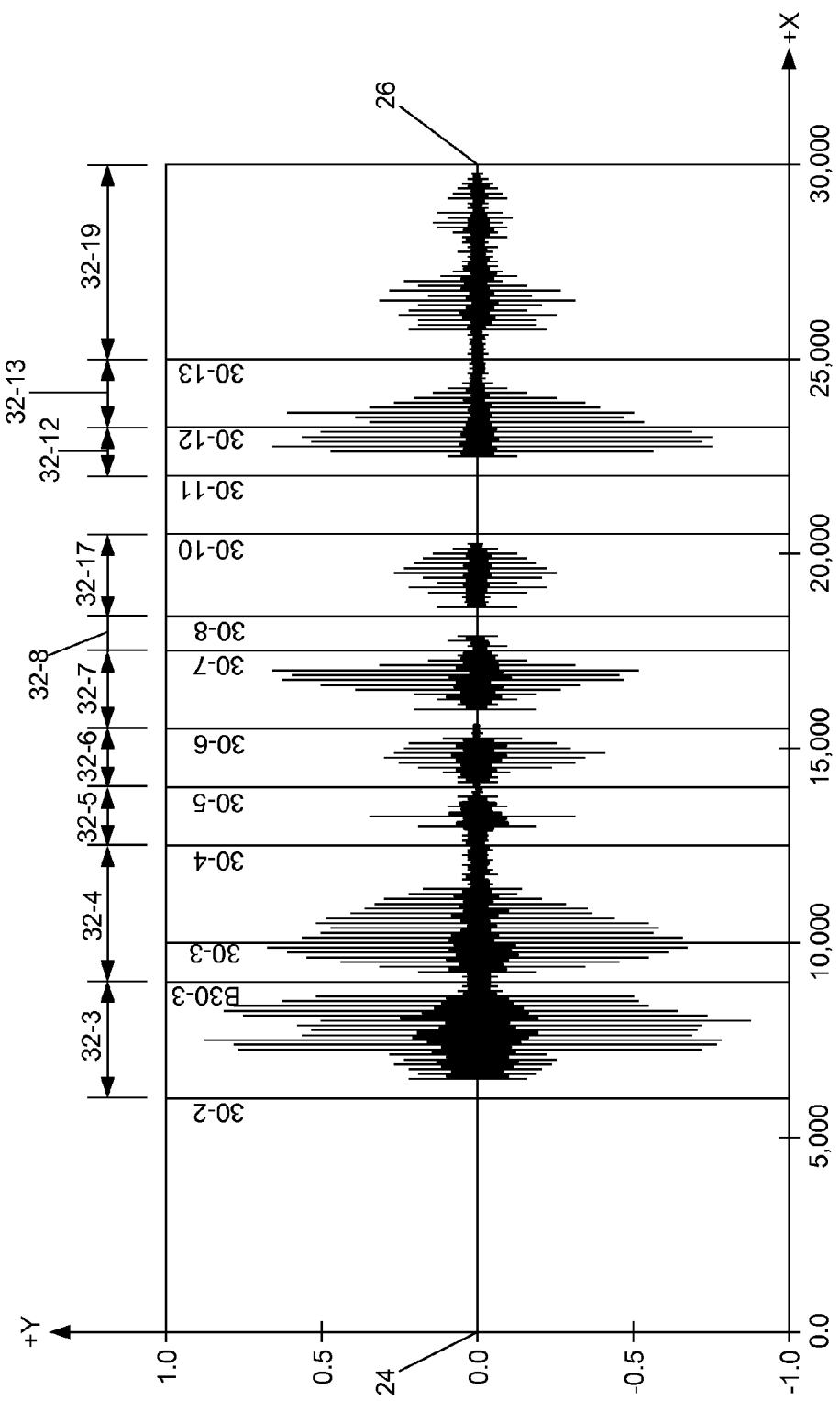
FIG. 13 is a diagram illustrating the prosodic unit candidate sequence as shown in FIG. 12 further including yet another merged prosodic unit candidate.

FIG. 13 is a diagram illustrating the prosodic unit candidate sequence as shown in FIG. 12 further including a new prosodic unit candidate 32-19 created by merging prosodic unit candidates 32-16 and 32-18. By virtue of merging candidates 32-16 and 32-18, the number of prosodic unit candidates in the prosodic unit sequence is reduced from eleven to ten. Specifically, the prosodic unit sequence includes prosodic unit candidates 32-3 to 32-8, 32-12, 32-13, 32-17 and 32-19. Moreover, each of the prosodic unit candidates is a true prosodic unit. Thus, the sequence constitutes a final prosodic unit sequence because it includes ten true prosodic units. Each true prosodic unit included in the final sequence may be used to create an HMM in which each true prosodic unit defines a state in the HMM.

Although the desired number of true prosodic units is described as ten, the signal 22 may alternatively be split into any desired number of true prosodic units. It should be appreciated that the desired number of true prosodic units generally depends on the phrase uttered and captured from the user. However, the desired number of true prosodic units may be determined in any manner and should be adequate to facilitate conducting accurate authentication transactions and generating trustworthy authentication transaction results.

When the prosodic unit candidate sequence includes more than the desired number of prosodic unit candidates, the number of prosodic units included in the sequence may be reduced by removing unwanted candidates, or by merging adjacent prosodic unit candidates together. When the sequence does not include more than the desired number of candidates, authentication data is again captured from the user.

Figure 14:
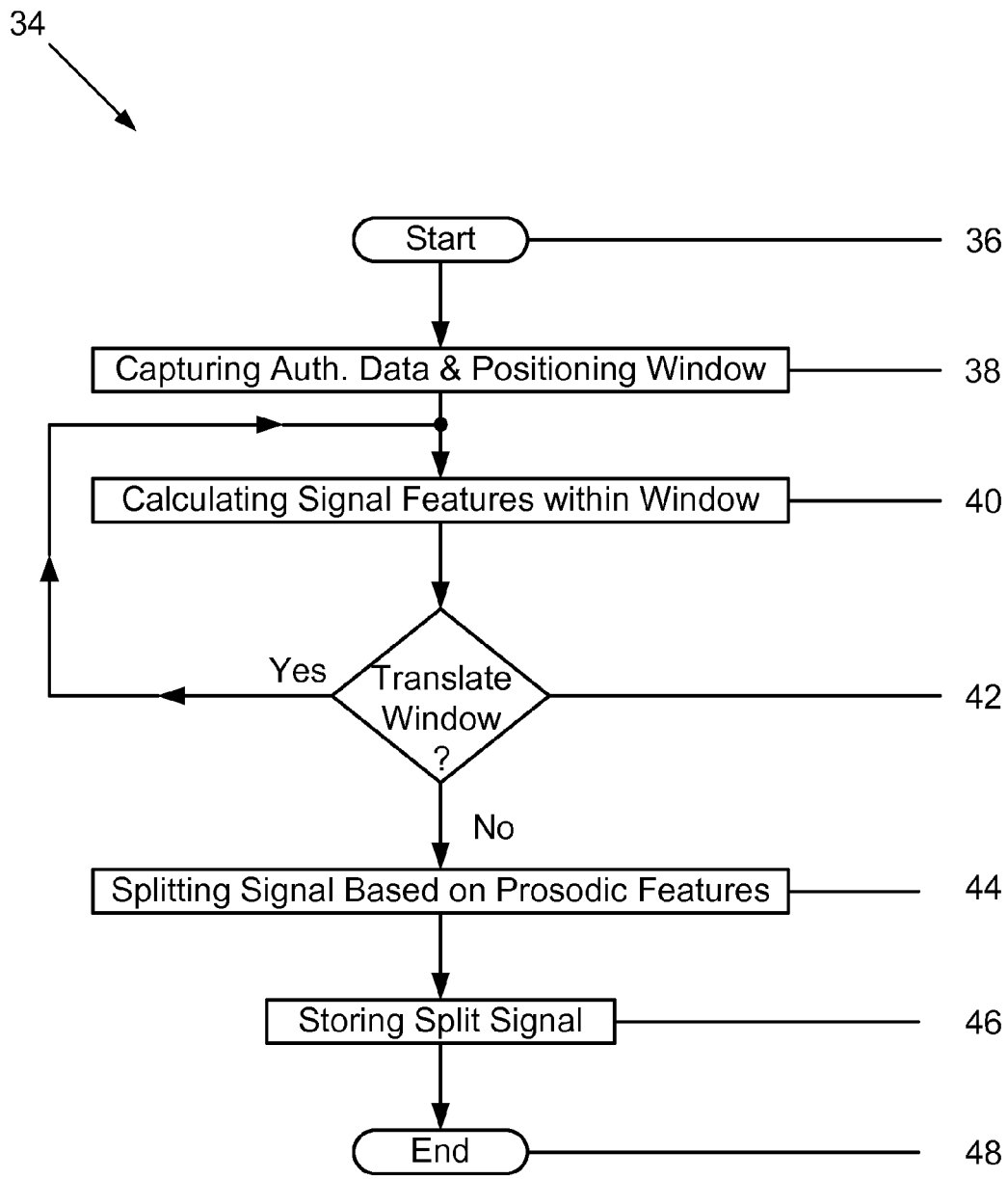
FIG. 14 is a flowchart illustrating an exemplary method for splitting a digital signal using prosodic features included in the signal.

FIG. 14 is a flowchart 34 illustrating an exemplary method for splitting a digital signal using prosodic features included in the signal during enrollment in the AC system 12 or during an authentication transaction. The process starts 36 by capturing 38 voice biometric data as a signal 22 from a user speaking a known phrase with the DC device 10, positioning 38 the temporal window 28 in an initial position over the signal 22, and calculating the signal features 40 for the portion of the signal 22 within the window 28. After calculating 40 the signal features, processing continues by determining 42 whether the temporal window 28 should be translated into a different position over the signal 22. When the temporal window 28 is not at the terminus 26, processing continues by translating the window ten milliseconds and calculating 40 the signal features for the portion of the signal 22 within the differently positioned window.

Otherwise, processing continues by splitting 44 the signal 22 using a phonetic cue type prosodic feature included in the utterance represented by the signal 22. For example, the phonetic cue type prosodic feature may be stress accents included in the utterance. More specifically, processing continues by calculating the locations of the stress accents in the signal 22 and superimposing the stress accent locations on the signal 22. By virtue of superimposing the stress accents on the signal 22, different portions of the signal 22 are located between successive stress accents.

A region between successive stress accents is a prosodic unit candidate. Thus, each pair of successive stress accents forms a prosodic unit candidate. Moreover, each prosodic unit candidate includes a different portion of the signal 22. Thus, the signal 22 is split into a plurality of prosodic unit candidates. It should be understood that the prosodic unit candidates together constitute a prosodic unit candidate sequence. The prosodic unit candidate sequence may also be referred to as a prosodic unit segmentation. Processing continues by storing 46 the prosodic unit candidates in an enrollment data record of the user who spoke the utterance represented by the signal 22. Next, processing ends 48.

Figure 15:
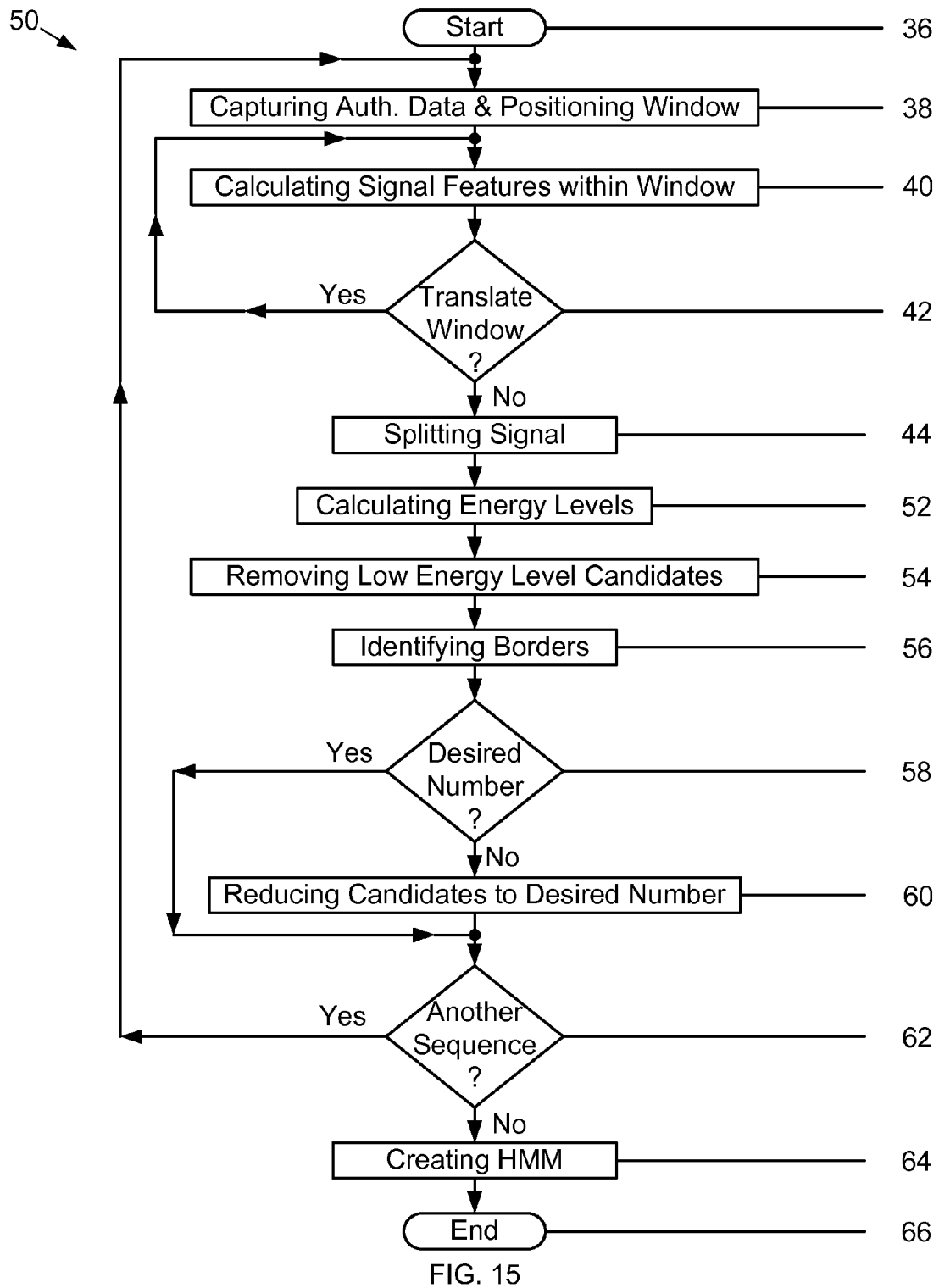
FIG. 15 is a flowchart illustrating an alternative exemplary method for splitting a digital signal using prosodic features included in the signal.

The information shown in FIG. 15 is the same information shown in FIG. 14 as described in more detail below. As such, features illustrated in FIG. 15 that are identical to features illustrated in FIG. 14 are identified using the same reference numerals used in FIG. 14.

FIG. 15 is a flowchart 50 illustrating an alternative exemplary method for splitting a digital signal using prosodic features included in the signal during enrollment in the AC system 12. This alternative process is similar to that shown in FIG. 14. However, the prodosic unit candidates in the sequence are processed to create a final sequence that includes only true prosodic units. That is, the sequence of prosodic unit candidates is modified, or adjusted, to include only true prosodic units. Moreover, the true prosodic unit sequence is used to create an HMM. More specifically, after splitting 44 the signal 22 processing continues by calculating 52 the energy level for each prosodic unit candidate in the sequence. The energy level for each prosodic unit candidate is the energy level of the signal portion within the respective prosodic unit candidate. Portions of the signal 22 that have higher amplitudes typically have higher energy levels while portions having lower amplitudes typically have lower energy levels.

Next, processing continues by removing 54 from the sequence prosodic unit Candidates having a low energy level. Next, processing continues by identifying 56 borders, shared by prosodic unit candidates, that are located in a high level energy region of the signal 22, and moving 56 the identified borders to a low energy level region of the signal 22. After moving 56 the identified borders to a low energy level region, processing continues by determining whether the sequence of prosodic unit candidates includes a desired number 58 of candidates. In this exemplary method the desired number of candidates is ten.

If the sequence of prosodic unit candidates does not include the desired number 58 of candidates, processing continues by reducing 60 the number of prosodic unit candidates to the desired number. More specifically, processing continues by calculating dispersion scores for each prosodic unit candidate, and removing or merging prosodic unit candidates using the calculated dispersion scores. Otherwise, when the sequence includes the desired number of prosodic unit candidates 58, 60, processing continues by identifying the sequence as a final prosodic unit sequence and determining whether another final prosodic unit sequence 62 is to be created. In this exemplary method, three final prosodic unit sequences are required. Alternatively, any number of final prosodic unit sequences may be required that facilitate enhancing the trustworthiness of authentication transaction results as described herein.

When another final prosodic unit sequence 62 is to be created, processing continues by capturing authentication data 38 from the user. Otherwise, when another sequence 62 is not required, processing continues by creating 64 an HMM in which each true prosodic unit, of the three final prosodic unit sequences, defines a state in the HMM. Next, processing continues by optimizing the HMM within each state and storing the HMM in the enrollment data record of the user. Next, processing ends 66.

Figure 16:
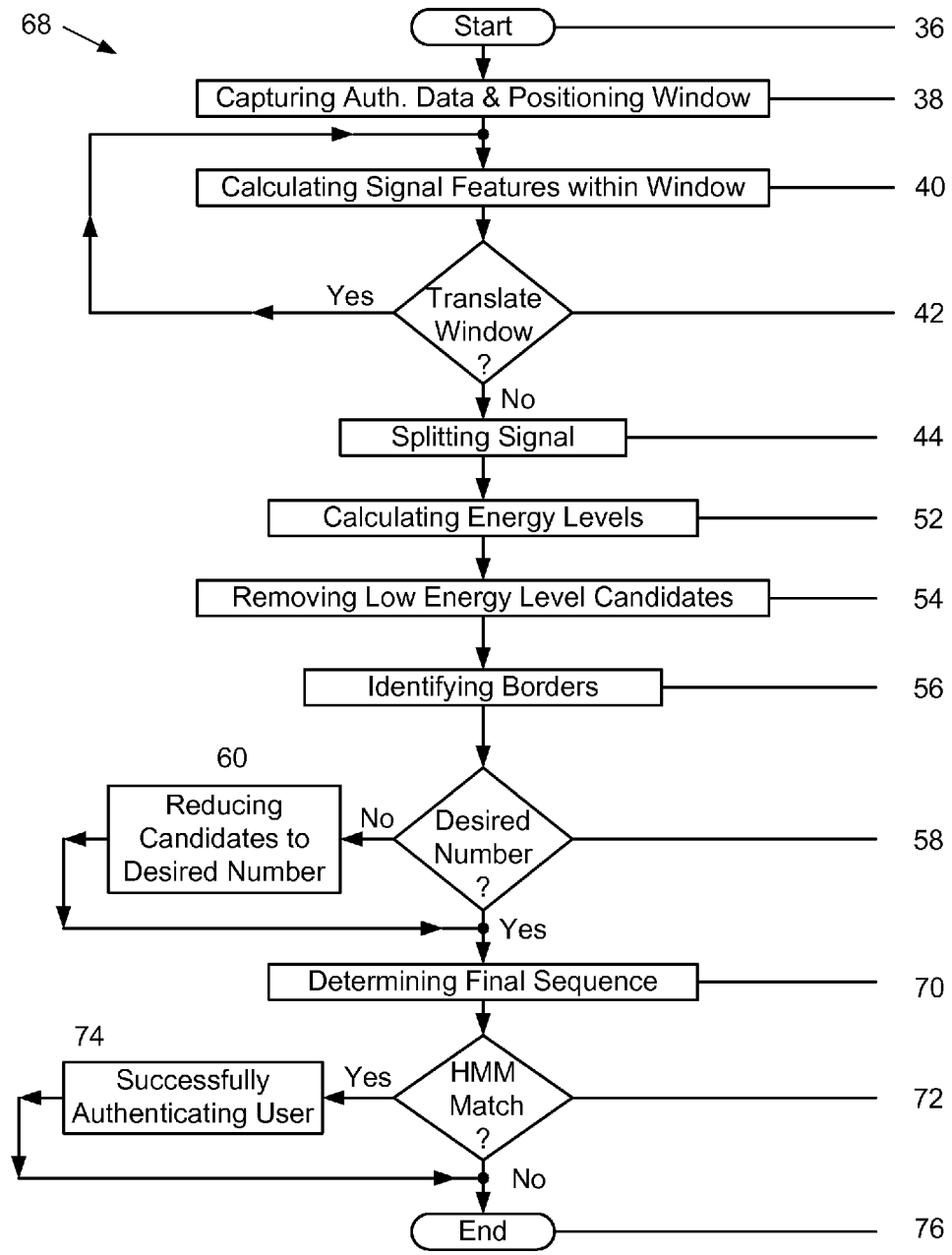
FIG. 16 is a flowchart illustrating an exemplary authentication method based on voice biometric authentication data.

The information shown in FIG. 16 is the same information shown in FIG. 15 as described in more detail below. As such, operations illustrated in FIG. 16 that are identical to operations illustrated in FIG. 15, are identified using the same reference numerals used in FIG. 15.

FIG. 16 is a flowchart 68 illustrating an exemplary authentication method based on voice biometric authentication data. The exemplary authentication process includes the method for splitting a digital signal described with regard to FIG. 15. However, the voice biometric data is captured from the user during an authentication transaction. Moreover, after reducing 60 the sequence to a final sequence including only true prosodic units, processing continues by determining that the sequence is a final sequence 70 and calculating a decision score using the HMM stored in the enrollment data record of the user and a UBM. Next, processing continues by calculating 72, using the HMM, a first probability that the true prosodic unit sequence matches the HMM. Next, processing continues by calculating 72, using the UBM, a second probability that the true prosodic unit sequence matches the UBM. When the difference between the first and second probabilities is greater than a probability decision threshold, processing continues by successfully authenticating the user 74. Next, processing ends 76. Otherwise, the user is not successfully authenticated and processing ends 76.

The methods for splitting signals described herein use text-dependent voice biometric data. However, it should be understood that the methods for splitting signals described herein may also be applied to text-independent voice biometric data.

The methods described herein for splitting signals and authenticating users based on the split signals, may also be used to identify different languages.

In each embodiment, the above-described methods and systems for splitting a digital signal based on prosodic features included in the signal facilitate generating trustworthy authentication transaction results without using a voice activity detection system. More specifically, signal features are calculated for a signal that represents an utterance spoken by a user. The signal features include onset values that may be used to locate stress accents in the signal. The stress accents are superimposed on the signal to thus split the signal into a sequence of prosodic unit candidates. The prosodic unit candidates in the sequence are processed such that a final sequence is generated that includes only true prosodic units. During enrollment, a Hidden Markov Model is created in which each true prosodic unit defines a state in the model. During an authentication transaction, the final sequence of true prosodic units is used to authenticate the user against the enrollment Hidden Markov model and a Universal Background Model.

As a result, voice authentication transactions may be conducted without strong prior knowledge as required by known speaker verification systems which require phones sequence extraction and thus speech transcription capabilities. Moreover, as the sequence of true prosodic units conveys information regarding the user identity, the trustworthiness of authentication transaction results is facilitated to be enhanced and the costs associated with successful spoofing are facilitated to be reduced.

Exemplary embodiments of methods for splitting signals with prosodic features included in the signal are described above in detail. The methods are not limited to use with the specific authentication computer systems described herein, but rather, the methods can be utilized independently and separately from other computer components described herein. For example, the methods for splitting signals described herein may be implemented by most computer systems, and may be used for a wide range of authentication scenarios, including remotely conducting a payment transaction over the Internet. Moreover, the invention is not limited to the embodiments of the methods described above in detail. Rather, other variations of the methods may be utilized within the spirit and scope of the claims.

While the invention has been described in terms of various specific embodiments, those skilled in the art will recognize that the invention can be practiced with modification within the spirit and scope of the claims.

What is claimed is:

1. A method for authenticating users comprising:
    calculating signal features for an audio digital signal representing a user utterance, the signal features including onset values, the onset values correspond to stress accents in the signal;
    splitting, by a processor, the signal into a prosodic unit candidate sequence based on the stress accent locations;
    modifying, by the processor, the prosodic unit candidate sequence based on the signal features, the modified prosodic unit sequence including only true prosodic units
    calculating a first probability that the true prosodic units match a prosodic unit sequence used to create a hidden Markov model for the user;
    calculating a second probability that the true prosodic units match prosodic unit sequences used to create a Universal Background Model; and
    successfully authenticating the user when the difference between the first probability and the second probability is greater than a decision threshold.

2. A method in accordance with claim 1, said modifying step comprising:
    calculating the energy level for each prosodic unit candidate in the prosodic unit candidate sequence; and
    removing from the prosodic unit candidate sequence prosodic unit candidates having a low energy level.

3. A method in accordance with claim 1, said modifying step comprising:
    identifying borders, shared by prosodic unit candidates, located in a high level region of the signal; and
    moving the identified borders to a low level energy region of the signal.

4. A method in accordance with claim 1, further comprising:
    creating a hidden Markov model in which each true prosodic unit defines a state in the model; and
    optimizing the model.

5. A computing system for authenticating users comprising:
    a processor; and
    a memory configured to store data, said computing device being associated with a network and said memory being in communication with said processor and having instructions stored therein which, when read and executed by said processor cause said computing device to:
    calculate signal features for an audio digital signal representing a user utterance, the signal features including onset values, the onset values correspond to stress accents in the signal;
    split the signal into a prosodic unit candidate sequence based on the stress accent locations;
    modify the prosodic unit candidate sequence based on the signal features, the modified prosodic unit sequence including only true prosodic units;
    calculate a first probability that the true prosodic units match a prosodic unit sequence used to create a hidden Markov model for the user;
    calculate a second probability that the true prosodic units match prosodic unit sequences used to create a Universal Background Model; and
    successfully authenticate the user when the difference between the first probability and the second probability is greater than a decision threshold.

6. A computing system in accordance with claim 5, wherein the instructions when executed by said processor further cause said computing device to:
    calculate the energy level for each prosodic unit candidate in the prosodic unit candidate sequence; and
    remove from the prosodic unit candidate sequence prosodic unit candidates having a low energy level.

7. A computing system in accordance with claim 5, wherein the instructions when executed by said processor further cause said computing device to:
    identify borders, shared by prosodic unit candidates, located in a high level region of the signal; and
    move the identified borders to a low level energy region of the signal.

8. A computing system in accordance with claim 5, wherein the instructions when executed by said processor further cause said computing device to:
    create a hidden Markov model in which each true prosodic unit defines a state in the model; and
    optimize the model.

9. A computing system in accordance with claim 5, wherein the instructions when executed by said processor further cause said computing device to compute a decision score using the hidden Markov model.

10. A computing system in accordance with claim 5, said computing device being a smart phone or a tablet computer.

11. A computing system in accordance with claim 5, said computing device being an authentication computer system.

12. A computer program recorded on a non-transitory computer-readable recording medium included in a computing device for generating trustworthy authentication transaction results, the computer program being comprised of instructions, which when read and executed by the computing device, cause the computing device to:

calculate signal features for an audio digital signal representing a user utterance, the signal features including onset values, the onset values correspond to stress accents in the signal;

split the signal into a prosodic unit candidate sequence based on the stress accent locations;

modify the prosodic unit candidate sequence based on the signal features, the modified prosodic unit sequence including only true prosodic units;

calculate a first probability that the true prosodic units match a prosodic unit sequence used to create a hidden Markov model for the user;

calculate a second probability that the true prosodic units match prosodic unit sequences used to create a Universal Background Model; and successfully authenticate the user when the difference between the first probability and the second probability is greater than a decision threshold.

13. A computer program in accordance with claim 12 wherein the instructions which when read and executed by the computing device, further cause the computing device to:

calculate the energy level for each prosodic unit candidate in the prosodic unit candidate sequence; and remove from the prosodic unit candidate sequence prosodic unit candidates having a low energy level.

14. A computer program in accordance with claim 12 wherein the instructions which when read and executed by the computing device, further cause the computing device to:

identify borders, shared by prosodic unit candidates, located in a high level region of the signal; and move the identified borders to a low level energy region of the signal.

15. A computer program in accordance with claim 12 wherein the instructions which when read and executed by the computing device, further cause the computing device to:

create a hidden Markov model in which each true prosodic unit defines a state in the model; and optimize the model.

16. A computer program in accordance with claim 12 wherein the instructions which when read and executed by the computing device, further cause the computing device to compute a decision score using the hidden Markov model.

* * * * *